(12) United States Patent
Sato

(10) Patent No.: US 12,271,178 B2
(45) Date of Patent: Apr. 8, 2025

(54) INFORMATION PROCESSING DEVICE

(71) Applicant: FANUC CORPORATION, Yamanashi (JP)

(72) Inventor: Shuji Sato, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 122 days.

(21) Appl. No.: 17/904,294

(22) PCT Filed: Feb. 24, 2021

(86) PCT No.: PCT/JP2021/006798
§ 371 (c)(1),
(2) Date: Aug. 16, 2022

(87) PCT Pub. No.: WO2021/172334
PCT Pub. Date: Sep. 2, 2021

(65) Prior Publication Data
US 2023/0061169 A1    Mar. 2, 2023

(30) Foreign Application Priority Data
Feb. 27, 2020 (JP) ................. 2020-031225

(51) Int. Cl.
*G05B 19/10* (2006.01)
*G05B 19/414* (2006.01)
*G05B 19/4155* (2006.01)

(52) U.S. Cl.
CPC ....... *G05B 19/414* (2013.01); *G05B 19/4155* (2013.01)

(58) Field of Classification Search
CPC .................. G05B 19/414; G05B 19/4155
USPC ............................................... 318/567
See application file for complete search history.

(56) References Cited

U.S. PATENT DOCUMENTS

| | | |
|---|---|---|
| 2014/0173665 A1 | 6/2014 | Kitazato et al. |
| 2018/0373832 A1* | 12/2018 | Sakarya .............. G16B 5/20 |
| 2019/0095246 A1 | 3/2019 | Nakano et al. |
| 2019/0101904 A1 | 4/2019 | Shimamura et al. |
| 2019/0196452 A1 | 6/2019 | Koga |
| 2019/0210642 A1* | 7/2019 | Bender ............... B62D 15/025 |

FOREIGN PATENT DOCUMENTS

| | | |
|---|---|---|
| CN | 109557889 A | 4/2019 |
| JP | 2015180065 A | 10/2015 |
| JP | 2017134459 A | 8/2017 |
| JP | 201967046 A | 4/2019 |
| JP | 2019113921 A | 7/2019 |

OTHER PUBLICATIONS

International Search Report in PCT/JP2021/006798, mailed May 11, 2021. 2pp.

* cited by examiner

*Primary Examiner* — Erick D Glass
(74) *Attorney, Agent, or Firm* — HAUPTMAN HAM, LLP

(57) ABSTRACT

An information processing device includes a command analysis unit configured to analyze a tendency of a command instruction for accessing a controller for each of applications, and a command delivery arbitration unit configured to arbitrate delivery of commands to the controller based on an analysis result by the command analysis unit.

3 Claims, 9 Drawing Sheets

FIG. 5

| | COMMAND | TYPE | PRIORITY | COMMAND INTERVAL |
|---|---|---|---|---|
| APPLICATION 1 | C1,C2 | REGULAR | C | 100[ms] |
| APPLICATION 2 | D | SPORADIC | D | 0(IRREGULAR) |
| APPLICATION 3 | B1,A1,C2,B2,A3,A4,B3 | FREQUENT | ABC | 10[ms] |
| APPLICATION 4 | A1,A2,A3,B2 | CONCENTRATIVE | AB | 60[ms] |

INFORMATION PROCESSING DEVICE

RELATED APPLICATIONS

The present application is a National Phase of International Application No. PCT/JP2021/006798 filed Feb. 24, 2021, which claims priority to Japanese Patent Application No. 2020-031225, filed Feb. 27, 2020.

TECHNICAL FIELD

The present invention relates to an information processing device, and particularly to an information processing device that accesses data in a controller for controlling an industrial machine.

BACKGROUND ART

In order for an application running on a personal computer to access data in a controller, the personal computer connected to the controller has a communication processing unit that serves as an interface with the controller. Among applications running on the personal computer, there are applications accessing data in the controller including an application frequently accessing the data with almost no interval, an application regularly accessing the data, an application sporadically accessing the data, etc.

In a state where a lot of such applications are running at the same time, due to an interference of the application frequently accessing the data in the controller, access of another application is frequently delayed, and the overall operations of the applications become slow.

Technology for addressing such a problem has been published (for example, Patent Document 1, etc.). In this technology, priority of data set by an application of a personal computer is transmitted to a controller. When a plurality of pieces of data is requested from the application of the personal computer, the controller transmits high-priority data first, stores the data in a buffer, and adjusts a transmission interval according to the load of the controller and an allowable response time.

CITATION LIST

Patent Document

Patent Document 1: JP 2017-134459 A

SUMMARY OF THE INVENTION

Problem to be Solved by the Invention

An application may frequently access a controller without considering overall performance, and a significantly large number of applications may simultaneously access a controller. In this case, in the controller connected to a personal computer, performance deterioration or processing delay occur due to access delay. Problems that occur in such a state include irregular access to data that needs to be processed on a regular basis, delay in processing even when an event that needs to be immediately processed occurs, a slowed overall operation of an application, etc.

This problem is difficult to solve even when a transmission order and a transmission time are adjusted according to the data priority, the load of the controller, and an allowable response time. Even when efficiency of a reply processing of data returned by the controller in response to a data request command is improved, it is impossible to improve efficiency of a processing of a command delivery from the personal computer to the controller or reduce the load thereof. A reason therefor is that transmission data of a write request cannot be efficiently processed.

In order to solve such a problem, it is necessary to arbitrate and appropriately distribute access to the controller for each application. To this end, it is necessary to have a mechanism that can recognize the amount and timing of access to the controller by each application and comprehensively manage and arbitrate.

Means for Solving Problem

An information processing device according to the present invention solves the above problem by detecting a state of excessive delivery from applications accessing a controller, and performing arbitration of a delivery order and arbitration of a delivery interval according to priority, thereby optimizing command delivery to the controller.

Further, an aspect of the present invention is an information processing device connected to a controller to control delivery of commands to the controller when the commands for accessing the controller are given from a plurality of applications, the information processing device including a command analysis unit configured to analyze a tendency of a command instruction for accessing the controller for each of the applications, and a command delivery arbitration unit configured to arbitrate delivery of the commands to the controller based on an analysis result by the command analysis unit.

Effect of the Invention

According to one aspect of the present invention, it becomes possible to recognize and analyze the amount and timing of access to the controller from individual application, which has been difficult in the past. Further, by quantifying an access tendency of individual application, it becomes possible to manage access to the controller for each application. Therefore, it is possible to arbitrate and appropriately distribute access to the controller from a large number of applications. As a result, it is possible to prevent performance deterioration or processing delay due to access delay.

BRIEF DESCRIPTION OF DRAWINGS

FIG. 5 is an example of an analysis result of command analysis of each application;

MODE(S) FOR CARRYING OUT THE INVENTION

Hereinafter, embodiments of the present invention will be described with reference to the drawings.

Figure 1:
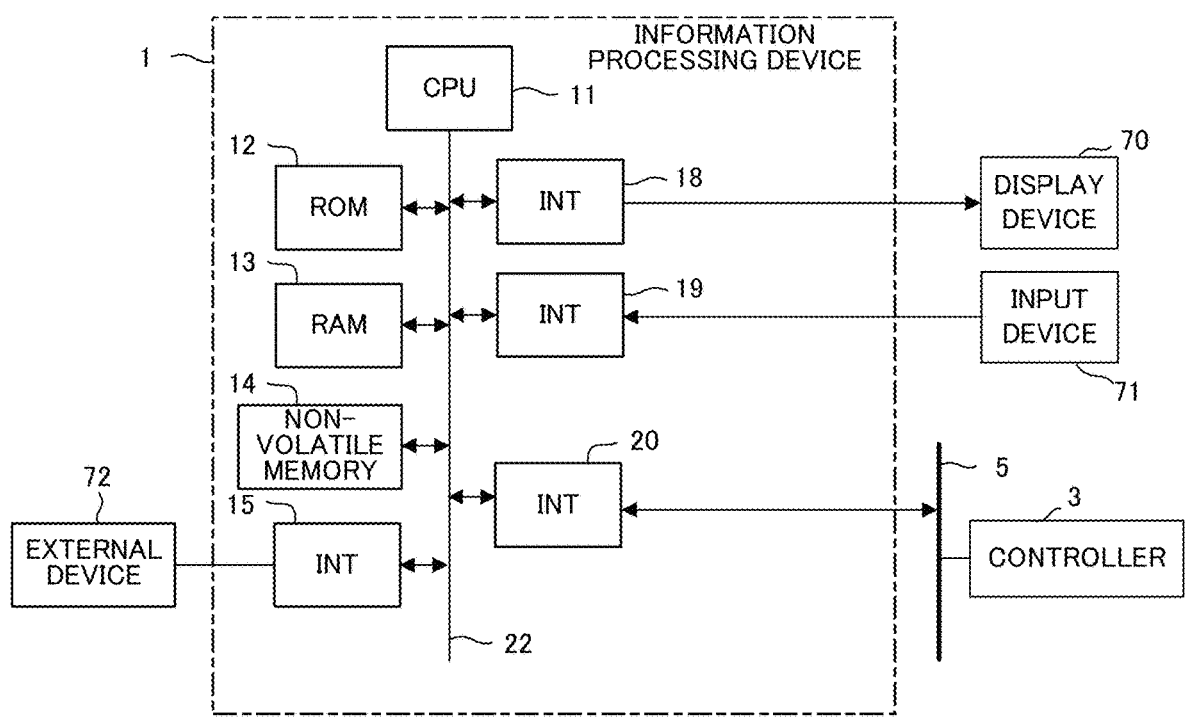
FIG. 1 is a schematic hardware configuration diagram of an information processing device according to an embodiment.

FIG. 1 is a schematic hardware configuration diagram of an information processing device according to an embodiment of the present invention. The information processing device 1 may be implemented in, for example, a personal computer installed side by side with a controller for controlling an industrial machine. Further, the information processing device 1 may be implemented in, for example, a personal computer, a fog computer, a cloud server, etc. connected to the controller for controlling the industrial machine via a wired/wireless network. The present embodiment shows an example in which the information processing device 1 is implemented in the personal computer connected to the controller for controlling the industrial machine via the wired/wireless network.

A CPU 11 included in the information processing device 1 according to the present embodiment is a processor that controls the information processing device 1 as a whole. The CPU 11 reads a system program stored in a ROM 12 via a bus 22. The CPU 11 controls the entire information processing device 1 according to the system program. Temporary calculation data, display data, various data input from the outside, etc. are temporarily stored in a RAM 13.

A non-volatile memory 14 includes an HDD (Hard Disk Drive), an SSD (Solid State Drive), etc. Data written to the non-volatile memory 14 is retained in a stored state even when power of the information processing device 1 is turned off. The non-volatile memory 14 stores data or a control program read from an external device 72 via an interface 15, data or a program input via an input device 71, each piece of data, etc acquired from the controller 3. The data or program stored in the non-volatile memory 14 may be loaded in the RAM 13 at the time of execution/use. Further, various system programs such as known analysis programs are written to the ROM 12 in advance.

The interface 15 is an interface for connecting the CPU 11 of the information processing device 1 and the external device 72 such as a USB device to each other. From the external device 72 side, for example, it is possible to read a control program used for controlling the industrial machine, each parameter, etc. Further, the control program, each parameter, etc. edited in the information processing device 1 may be stored in an external storage means via the external device 72, or may be transmitted to the controller 3 via a network 5.

Each piece of data read on a memory, data obtained as a result of executing the control program or the system program, etc. are output via an interface 18 and displayed on a display device 70. Further, the input device 71 including a keyboard, a pointing device, etc. delivers a command, data, etc. based on an operation by an operator to the CPU 11 via an interface 19.

An interface 20 is an interface for connecting the CPU 11 of the information processing device 1 and the wired or wireless network 5 to each other. The controller 3 for controlling the industrial machine is connected to the network 5 to mutually exchange data with the information processing device 1.

Figure 2:
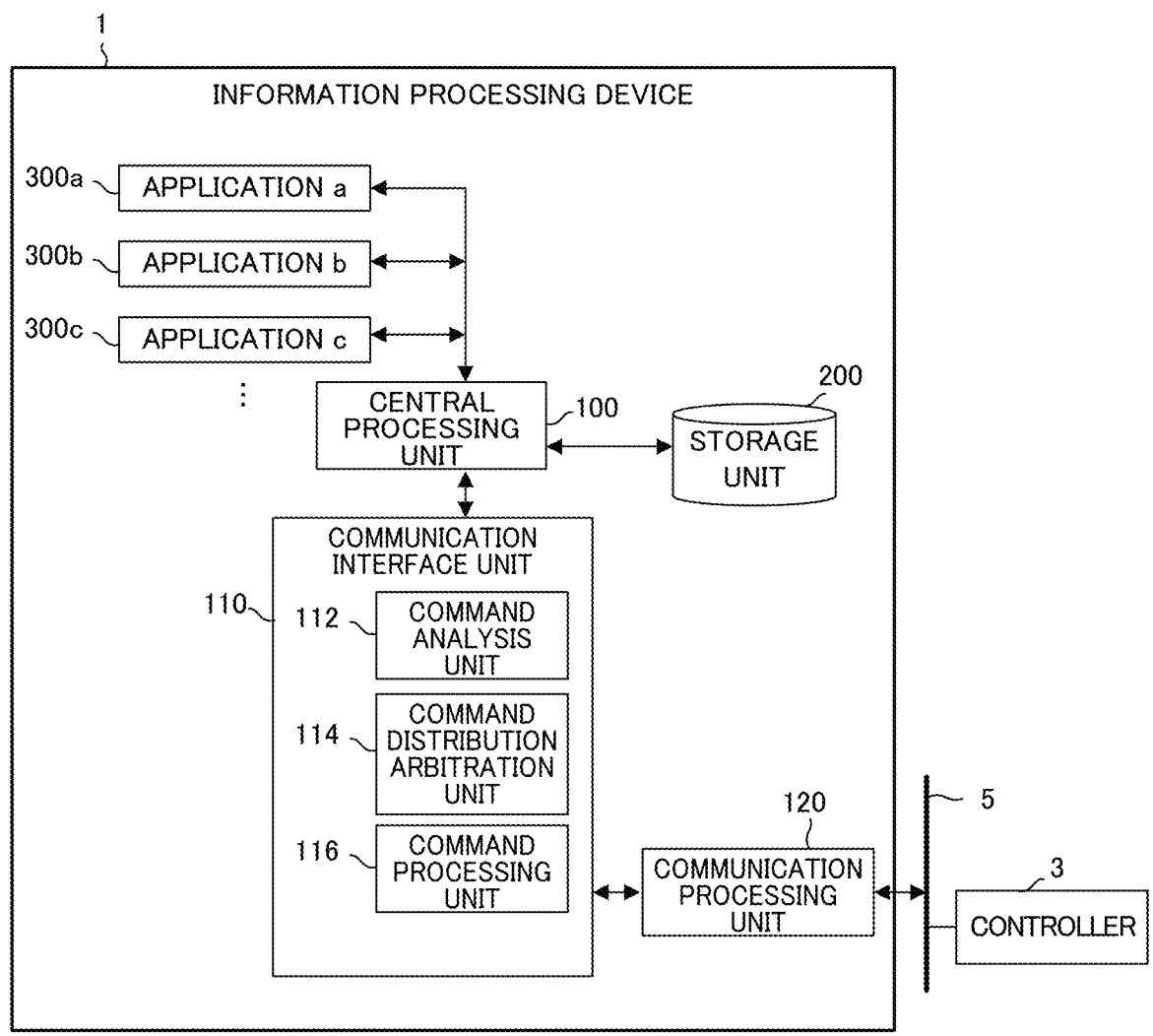
FIG. 2 is a schematic functional block diagram of an information processing device according to a first embodiment.

FIG. 2 illustrates a function of an information processing device 1 according to a first embodiment of the present invention as a schematic block diagram. Each function of the information processing device 1 according to the present embodiment is realized by the CPU 11 included in the information processing device 1 illustrated in FIG. 1 executing a system program and controlling an operation of each unit of the information processing device 1.

The information processing device 1 of the present embodiment includes a central processing unit 100, a communication interface unit 110, and a communication processing unit 120. Further, a storage unit 200, which is an area for storing information related to commands issued to access the controller 3 by applications 300a, 300b, 300c, . . . , is provided on the RAM 13 or the non-volatile memory 14.

The central processing unit 100 is realized by executing a system program read from the ROM 12 by the CPU 11 and performing arithmetic processing mainly by the CPU 11 using the RAM 13 and the non-volatile memory 14. The central processing unit 100 executes programs of the applications 300a, 300b, 300c, . . . running on the information processing device 1 to control operations of the respective applications 300a, 300b, 300c, . . . . The central processing unit 100 controls writing or reading from the respective applications 300a, 300b, 300c, . . . to the storage unit 200, outputting of a command to the communication interface unit 110, delivering of data acquired from the controller 3 as a response to the command, etc. The central processing unit 100 may be provided as a function of controlling an operation of an application by a general OS.

The communication interface unit 110 is realized by executing a system program read from the ROM 12 by the CPU 11 and performing arithmetic processing mainly by the CPU 11 using the RAM 13 and the non-volatile memory 14. The communication interface unit 110 analyzes and arbitrates commands for access to the controller 3 given from the respective applications 300a, 300b, 300c, . . . . The communication interface unit 110 outputs the commands to the communication processing unit 120 based on a result of analysis and arbitration. Further, upon receiving a response to a command from the communication processing unit 120, the communication interface unit 110 delivers the response to an application giving the command. The communication interface unit 110 includes a command analysis unit 112, a command delivery arbitration unit 114, and a command processing unit 116.

The command analysis unit 112 records a history of commands given for each application in the storage unit 200. Then, the command analysis unit 112 analyzes a tendency of the commands given for each application stored in the storage unit 200. For example, the command analysis unit 112 analyzes the type, frequency, periodicity of a command interval, etc. of the commands given from the applications, and classifies the commands given from the applications into types such as "frequent", "regular", "sporadic", "concentrative", etc. Further, the command analysis unit 112 sets the priority of the application based on the priority of the command given by each application. Furthermore, the command analysis unit 112 calculates parameters such as command intervals of the commands by the respective applications. Then, the command analysis unit 112 stores an analysis result of the application analyzed in this way in the storage unit 200. The command analysis unit 112 regularly analyzes the commands given by the respective applications.

Figure 3:
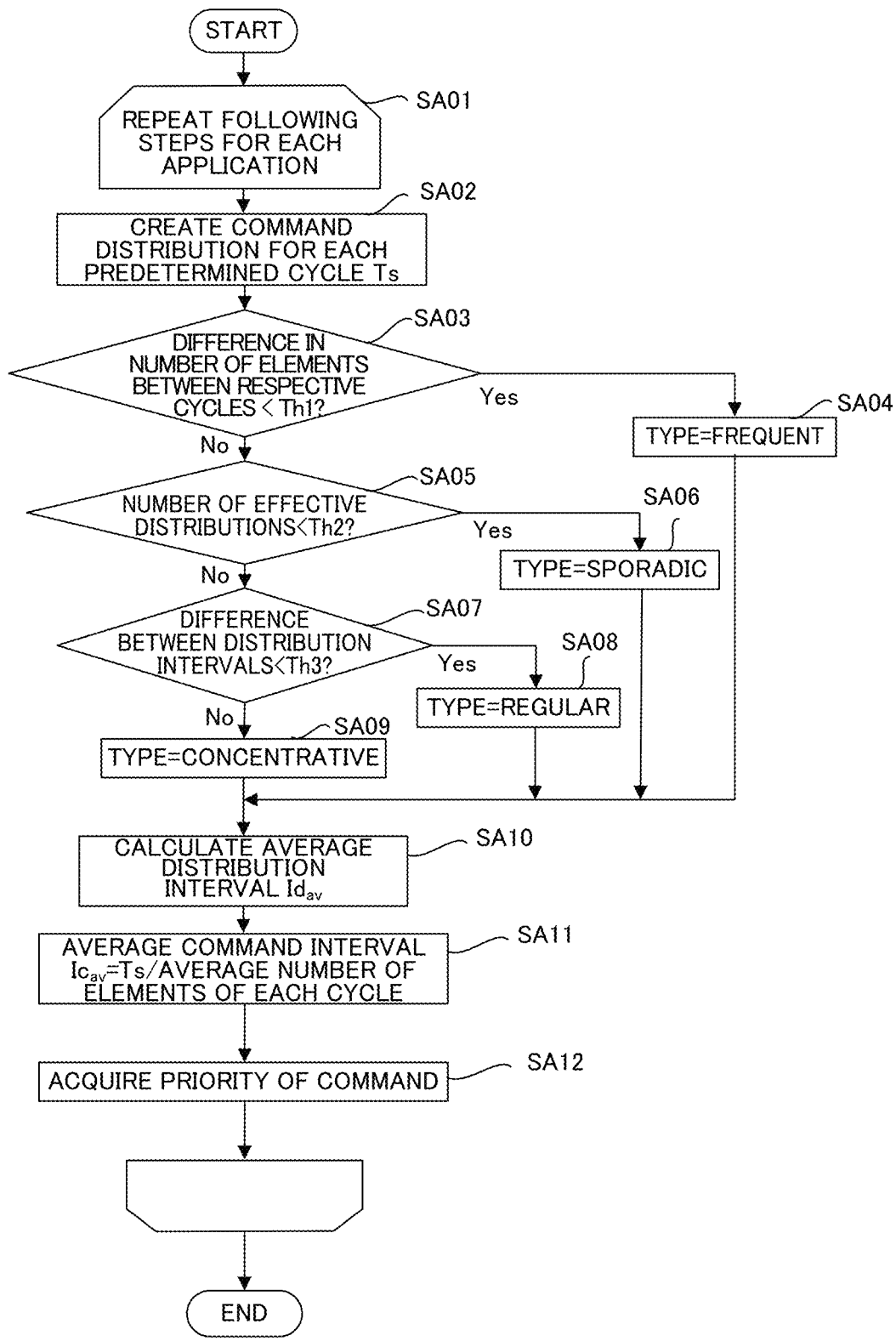
FIG. 3 is an example of a schematic flowchart of command analysis processing.

FIG. 3 is an example of a schematic flowchart of processing for analyzing a command, which is given from each application, by the command analysis unit 112. The command analysis unit 112 acquires a command history of the command for each application from the storage unit 200, and creates a command distribution for each predetermined cycle Ts (for example, Ts=200 ms) (step SA02). Then, the number of elements, an effective distribution, the number of effective distributions, and a distribution interval in a predetermined n cycle period determined in advance are calculated. Here, the number of elements refers to the number of commands in each cycle. The effective distribution refers to a cycle in which the number of elements is not zero. The number of effective distributions refers to the number of effective distributions in an n-cycle period. The distribution interval refers to the time or number of cycles between effective distributions. Further, when a difference in the number of elements between respective cycles in the n-cycle period is smaller than a predetermined threshold value Th1 determined in advance, the application type is set "frequent" (steps SA03 and SA04). Next, when a maximum value or an average value of the difference in the number of elements between the respective cycles in the n-cycle period is greater than or equal to the threshold value Th1, the number of effective distributions in the n-cycle period is compared with a predetermined threshold value Th2 determined in advance, and when the number of effective distributions is less than the threshold value Th2, the application type is set to "sporadic" (steps SA05 and SA06). Furthermore, when the number of effective distributions in the n-cycle period is greater than or equal to the threshold value Th2, a maximum value or an average value of a difference between respective distribution intervals in the n-cycle period is compared with a predetermined threshold value Th3 determined in advance, and when the difference between the distribution intervals is less than the threshold value Th3, the application type is set to "regular" (steps SA07 and SA08). Then, when none of the conditions are satisfied, the application type is set to "concentrative" (step SA09).

The command analysis unit 112 further calculates an average distribution interval $Id_{av}$ and an average command interval $Ic_{av}$ of the commands (steps SA10 and SA11), and acquires the priority preset for each command (step SA12).

Figure 4:
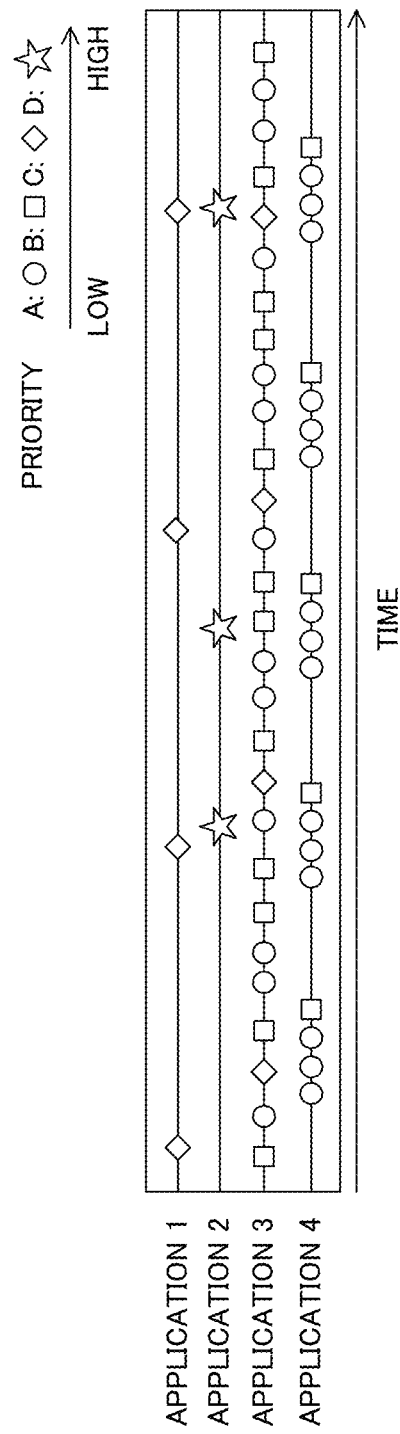
FIG. 4 is an example of a timing chart of a command instruction for each application.

FIG. 4 illustrates commands given by the respective applications in a timing chart. In addition, FIG. 5 illustrates an example of an analysis result obtained by analyzing the respective applications illustrated in the timing chart of FIG. 4 by the command analysis unit 112. As illustrated in FIGS. 4 and 5, an application having a large number of commands given in the entire cycle is set as "frequent". An application having a small number of commands given in the entire cycle is set as "sporadic". An application having a constant command cycle is set as "regular". Other applications are set as "concentrative".

Figure 6:
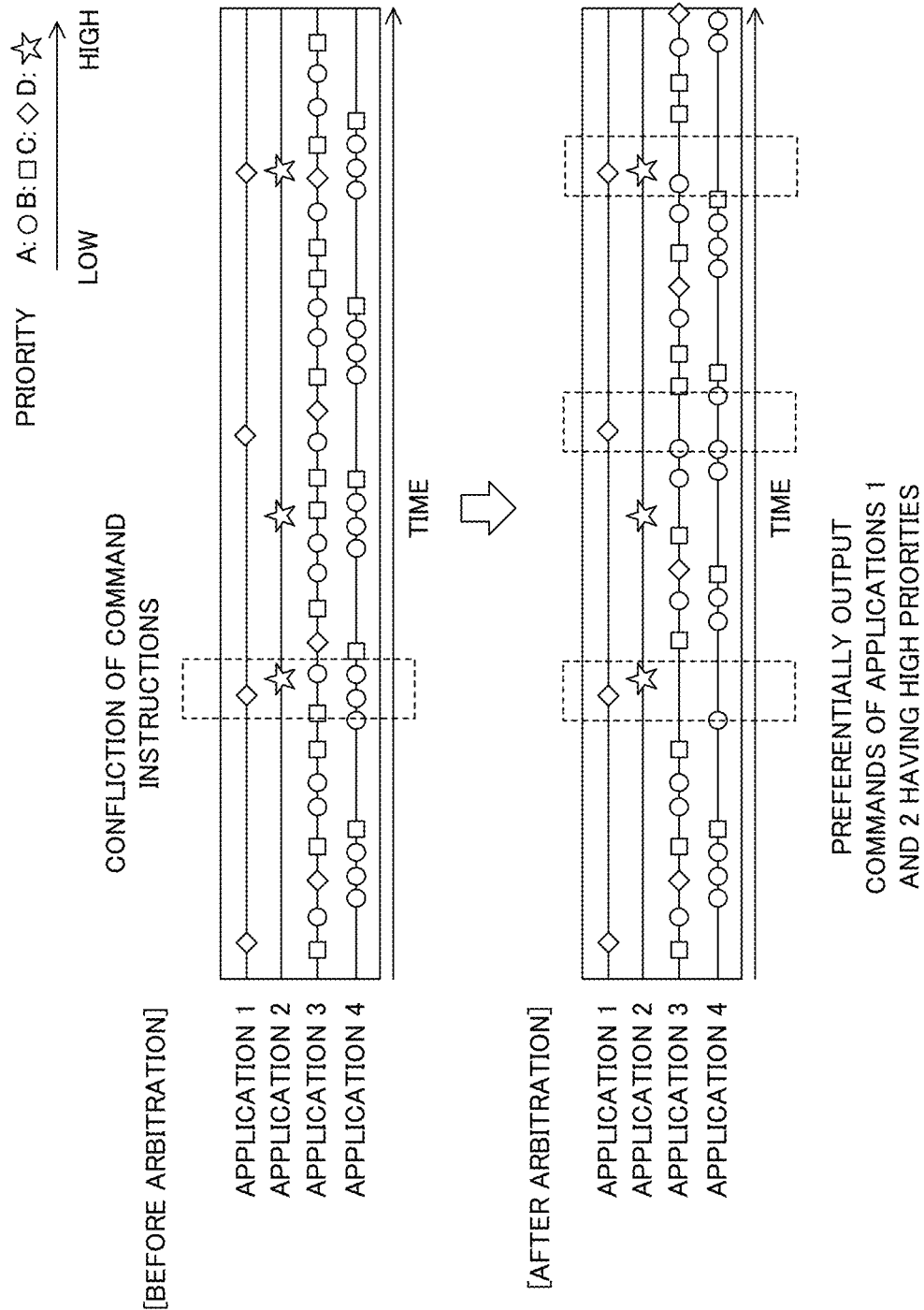
FIG. 6 is an arbitration example of command delivery by a command delivery arbitration unit.

The command delivery arbitration unit 114 arbitrates output of the command given from the application to the communication processing unit 120 (delivery to the controller 3) based on an analysis result (classification content) of the command analysis unit. When commands are excessively densely given from a plurality of applications (for example, when a command interval of commands given from a plurality of applications is equal to or less than a predetermined allowable interval determined in advance, or when commands are given from a plurality of applications at the same timing), the command delivery arbitration unit 114 instructs the command processing unit 116 to preferentially output commands given by the application having the type "sporadic" and the application having the type "regular" to the communication processing unit 120 over other commands, and delay output of the other commands. In addition, when commands are excessively densely given from a plurality of applications, the command delivery arbitration unit 114 instructs the command processing unit 116 to preferentially output a command having a high priority (a command having priority D or priority C in the example of FIG. 4) to the communication processing unit 120 over other commands, and delay output of the other commands. In addition, the command delivery arbitration unit 114 instructs the command processing unit 116 to output commands to the communication processing unit 120 while adjusting a command interval of the commands to an interval greater than or equal to a predetermined allowable interval so as not to excessively transmit commands to the controller 3. FIG. 6 is a diagram illustrating an example of arbitration by the command delivery arbitration unit 114. As illustrated in FIG. 6, when command instructions conflict or commands are excessively densely given, the command delivery arbitration unit 114 performs arbitration to delay output of a command of an application having a low priority or a command having a low priority.

Figure 7:
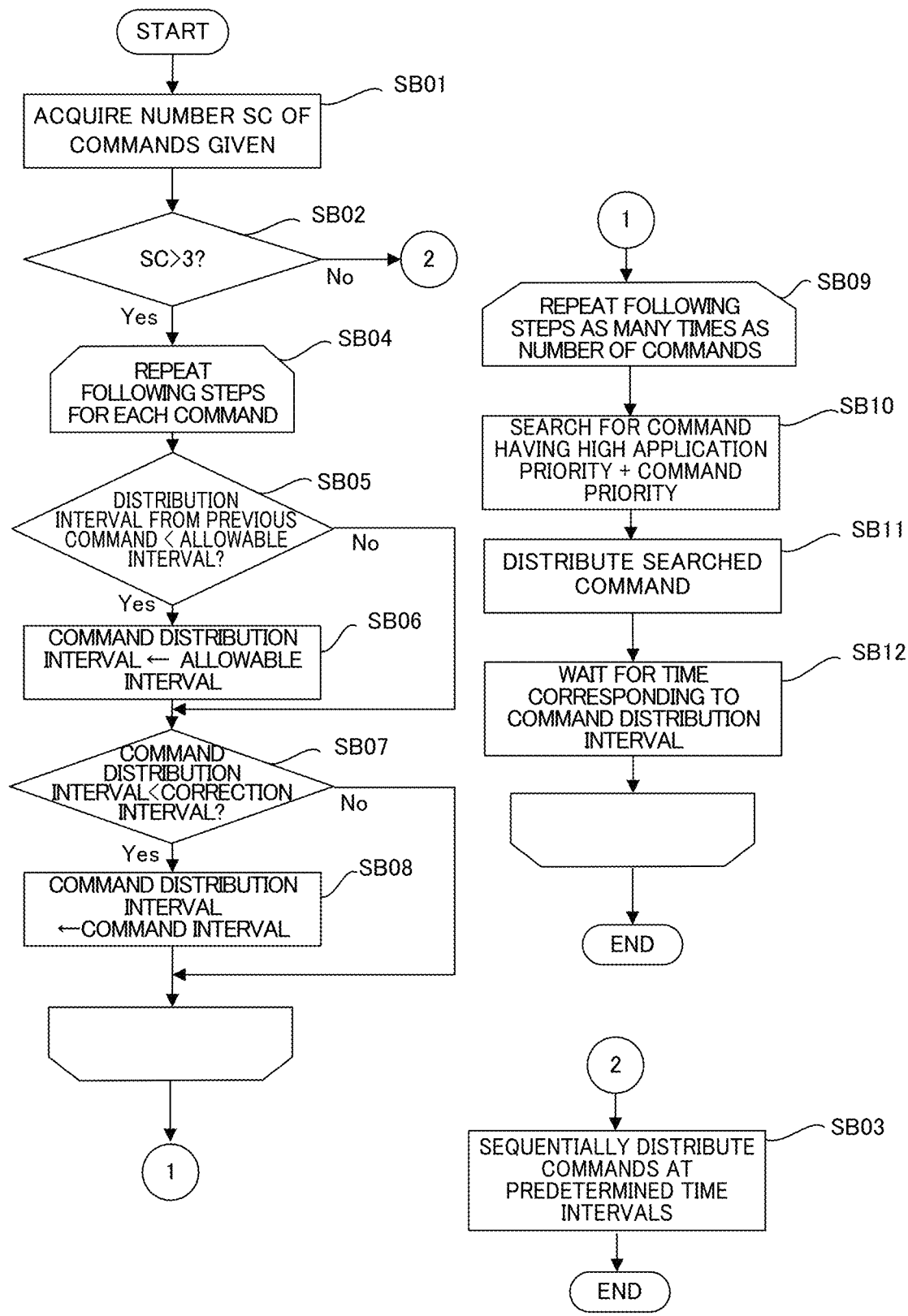
FIG. 7 is an example of a schematic flowchart of command delivery arbitration processing.

FIG. 7 is an example of a schematic flowchart of command delivery arbitration processing by the command delivery arbitration unit 114. The command delivery arbitration unit 114 counts the number SC of commands currently given by the respective applications for each execution cycle (step SB01). Then, when the number of given commands does not exceed three, the command delivery arbitration unit 114 instructs the command processing unit 116 to sequentially deliver the given commands at predetermined time intervals (step SB03). On the other hand, when the number of given commands exceeds three, the command delivery arbitration unit 114 modifies a command delivery interval for each command with an allowable interval and a command interval (or a correction interval described later) (steps SB04 to SB08).

Then, the command delivery arbitration unit 114 calculates the priority of each command based on the priority of the application giving the command and the priority of the command itself. As a result of calculation, the command delivery arbitration unit 114 instructs the command processing unit 116 to deliver the commands in order from a command determined to have the highest priority (steps SB09 to SB12).

The command processing unit 116 converts a format of commands for access to the controller 3 output from the applications 300a, 300b, 300c, . . . into a format that can be interpreted by the controller 3 and transfers the commands to the communication processing unit 120.

The communication processing unit 120 is realized by executing a system program read from the ROM 12 by the CPU 11 and performing arithmetic processing mainly by the CPU 11 using the RAM 13 and the non-volatile memory 14 and input/output processing using the interface 20. The communication processing unit 120 outputs a command input from the communication interface unit to the controller 3 via the network 5. Further, upon receiving a response from the controller 3, the communication processing unit 120 transfers the received response to the communication interface unit 110.

The information processing device 1 according to the present embodiment having the above configuration may recognize and analyze the amount and timing of access to the controller from the individual applications, which has been difficult in the past. Further, by quantifying an access tendency of the individual applications, it becomes possible to manage access to the controller for each application. Therefore, it is possible to arbitrate and appropriately distribute access to the controller from a large number of applications. As a result, it is possible to prevent performance deterioration or processing delay due to access delay.

In the past, it has been necessary to adjust the access amount or the access timing and interval by modifying the individual applications in order to adjust access to the controller 3. In the information processing device 1 according to the present embodiment, adjustment is automatically performed by the command delivery arbitration unit 114, and the adjustment amount may be corrected by an arbitration correction tool unit 130. Therefore, it becomes unnecessary to modify the individual applications.

Figure 8:
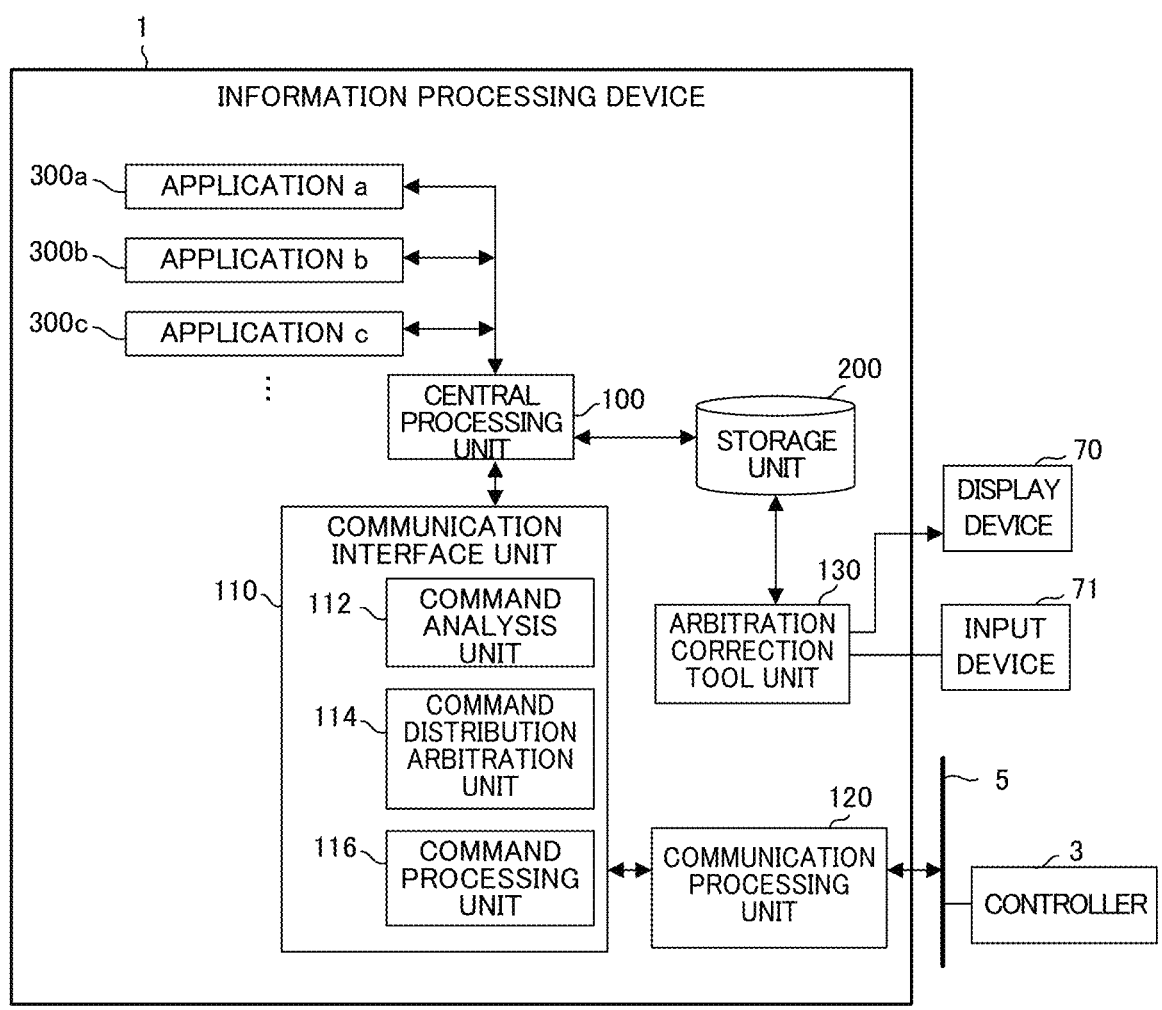
FIG. 8 is a schematic functional block diagram of an information processing device according to a second embodiment.

FIG. 8 illustrates a function of an information processing device 1 according to a second embodiment of the present invention as a schematic block diagram. Each function of the information processing device 1 according to the present embodiment is realized by the CPU 11 executing a system program and controlling an operation of each unit of the information processing device 1.

The information processing device 1 of the present embodiment further includes the arbitration correction tool unit 130 in addition to the central processing unit 100, the communication interface unit 110, and the communication processing unit 120. Further, the storage unit 200, which is an area for storing information related to commands issued to access the controller 3 by applications 300a, 300b, 300c, . . . , is provided on the RAM 13 or the non-volatile memory 14.

The central processing unit 100, the communication interface unit 110, and the communication processing unit 120 included in the information processing device 1 according to the present embodiment have similar functions to those of the central processing unit 100, the communication interface unit 110, and the communication processing unit 120 included in the information processing device 1 according to the first embodiment.

Figure 9:
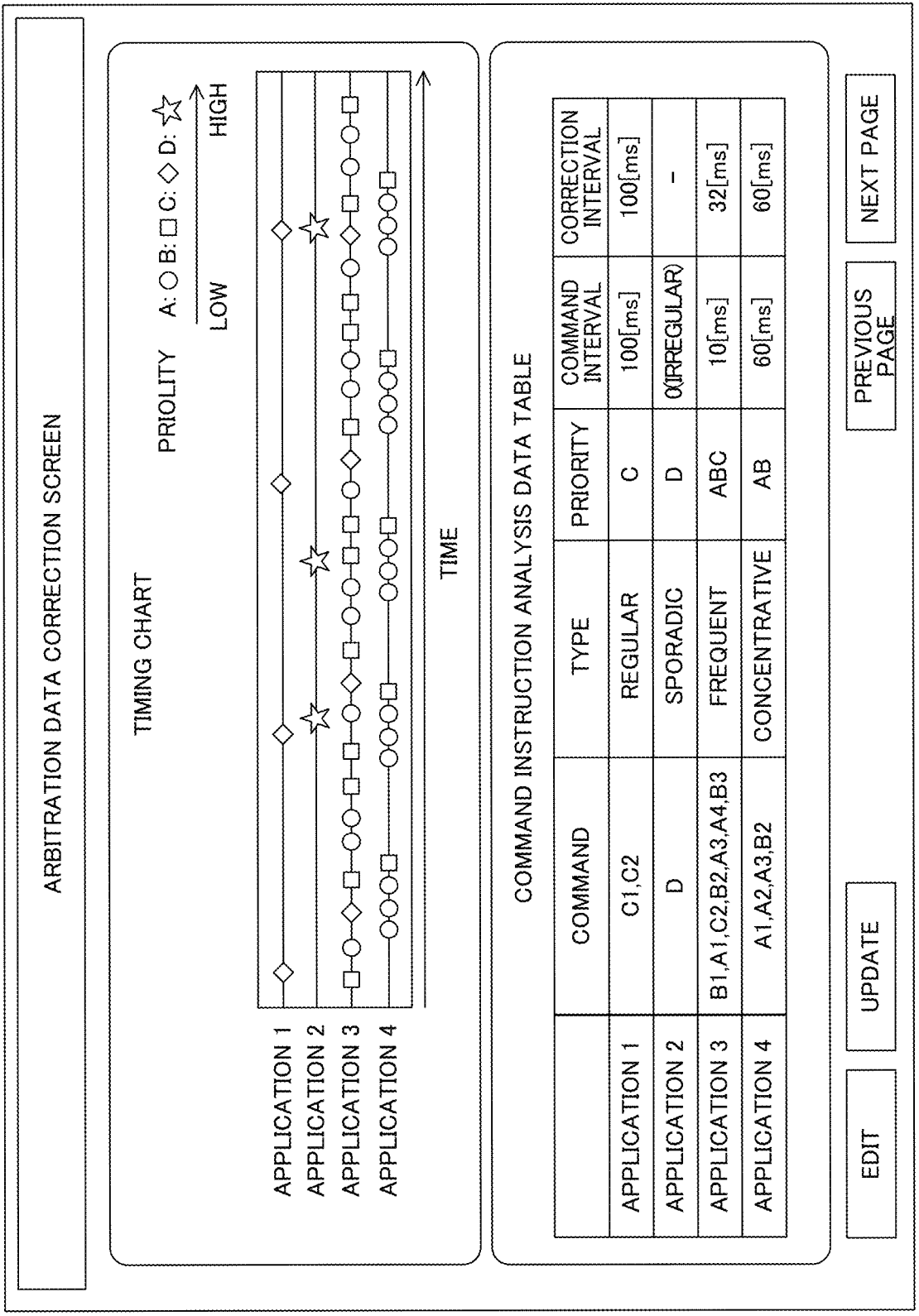
FIG. 9 is an example of a screen displayed by an arbitration correction tool unit.

The arbitration correction tool unit 130 is realized by executing a system program read from the ROM 12 by the CPU 11 included in the information processing device 1 illustrated in FIG. 1, and performing arithmetic processing using the RAM 13 and the non-volatile memory 14 mainly by the CPU 11 and input/output processing using the interfaces 18 and 19. The arbitration correction tool unit 130 displays an analysis result of the command analysis unit 112 on the display device 70. For example, as illustrated in FIG. 9, the arbitration correction tool unit 130 displays a timing chart of a command instruction for each application and a table of an analysis result. In the table of the analysis result of FIG. 9, a correction interval column is a column used for correcting a command interval (an average interval at which a command is given in the corresponding application). In the correction interval column, a command interval of each application is basically displayed. Further, for an application having a command interval equal to or less than a predetermined allowable interval determined in advance, an allowable interval value (32 ms in the example of FIG. 9) is displayed in the correction interval column. Note that when the application type is "sporadic", the correction interval column is not displayed (cannot be corrected). The operator may correct the command interval of the command in each application by editing the correction interval column while referring to the analysis result displayed on the display device 70. Further, the operator may change the priority of each application by changing a priority column. When the correction interval and the priority of the application are corrected by the operator, the arbitration correction tool unit 130 may arbitrate and display a command instruction by each application displayed on the timing chart again based on corrected content.

The information processing device 1 according to the present embodiment having the above configuration may use the analysis result by the command analysis unit 112 to arbitrate and appropriately distribute access to the controller 3 from a plurality of applications by the arbitration correction tool unit 130 and the command delivery arbitration unit 114. Therefore, it is possible to prevent performance deterioration or processing delay due to access delay.

Even though one embodiment of the present invention has been described above, the present invention is not limited to the only examples of the above-described embodiment, and may be implemented in various embodiments by making appropriate changes.

REFERENCE SIGNS LIST

1 INFORMATION PROCESSING DEVICE
3 CONTROLLER
5 NETWORK
11 CPU
12 ROM
13 RAM
14 NON-VOLATILE MEMORY
15, 18, 19, 20, 21 INTERFACE
22 BUS
70 DISPLAY DEVICE
71 INPUT DEVICE
72 EXTERNAL DEVICE
100 CENTRAL PROCESSING UNIT
110 COMMUNICATION INTERFACE UNIT
112 COMMAND ANALYSIS UNIT
114 COMMAND DELIVERY ARBITRATION UNIT
116 COMMAND PROCESSING UNIT
120 COMMUNICATION PROCESSING UNIT
130 ARBITRATION CORRECTION TOOL UNIT
200 STORAGE UNIT

The invention claimed is:

1. An information processing device connected to a controller to control access to the controller when commands for accessing the controller are given from a plurality of applications, the information processing device comprising:
a command analysis unit configured to analyze an access tendency of a command of the commands for accessing the controller from each of the plurality of applications, wherein the access tendency is defined by (i) a type of the command, (ii) a frequency of the command, and (iii) a periodicity of a command interval of the command for accessing the controller from each of the plurality of applications in a predetermined cycle period; and
a command delivery arbitration unit configured to arbitrate delivery of the commands to the controller based on the access tendency analyzed by the command analysis unit.

2. The information processing device according to claim 1, further comprising:
an arbitration correction tool unit configured to
visualize a timing chart illustrating a state of command delivery for each of the plurality of applications to the controller and an analysis result by the command analysis unit, and
correct a parameter related to arbitration of the command delivery.

3. The information processing device according to claim 1, wherein:
 an analysis result by the command analysis unit includes information related to priority for each application of the plurality of applications and priority for each command of the commands; and
 the command delivery arbitration unit is configured to, in response to the commands being excessively delivered, arbitrate command delivery in a delivery order according to the priority for each application and the priority for each command.

* * * * *